United States Patent [19]

Trier

[11] Patent Number: 4,527,951
[45] Date of Patent: Jul. 9, 1985

[54] PENDULUM FOR DAMPING OR ELIMINATING LOW EXCITATION FREQUENCIES

[75] Inventor: Ferdinand Trier, Munich, Fed. Rep. of Germany

[73] Assignee: Messerschmitt-Boelkow-Blohm Gesellschaft mit beschränkter Haftung, Munich, Fed. Rep. of Germany

[21] Appl. No.: 512,392

[22] Filed: Jul. 11, 1983

[30] Foreign Application Priority Data

Jul. 13, 1982 [DE] Fed. Rep. of Germany ....... 3226152

[51] Int. Cl.³ .............................................. B64C 27/32
[52] U.S. Cl. .................................. 416/145; 416/500; 74/574
[58] Field of Search .................. 416/145, 500; 74/574, 74/604

[56] References Cited

U.S. PATENT DOCUMENTS

| | | | |
|---|---|---|---|
| 2,137,418 | 11/1938 | Shay | 74/604 |
| 2,306,959 | 12/1942 | Knibbe | 416/145 X |
| 2,313,024 | 3/1943 | Salomon | 74/604 |
| 2,317,983 | 5/1943 | Fischer | 74/604 |
| 2,353,681 | 7/1944 | Martin et al. | 416/145 |
| 2,462,961 | 3/1949 | Harker | 416/145 |
| 2,462,962 | 3/1949 | Harker | 416/145 |
| 3,887,296 | 6/1975 | Mills et al. | 416/145 |
| 4,239,455 | 12/1980 | Broekhuizen et al. | 416/145 |
| 4,239,456 | 12/1980 | Joglekar et al. | 416/145 |

Primary Examiner—Everette A. Powell, Jr.
Attorney, Agent, or Firm—W. G. Fasse; D. H. Kane, Jr.

[57] ABSTRACT

Low excitation frequencies of a structural component, for example of a helicopter rotor blade or the like, are damped or eliminated by a pendulum device connected to the component, the excitation frequency or frequencies of which are to be damped or eliminated. In a helicopter rotor blade the pendulum device is preferably connected to the blade neck near the rotor head. The pendulum device has a plurality of pendulum bodies coupled to each other for forming a multiple pendulum in which these pendulum bodies are so tuned relative to each other that the multiple pendulum has several eigenfrequencies.

8 Claims, 8 Drawing Figures

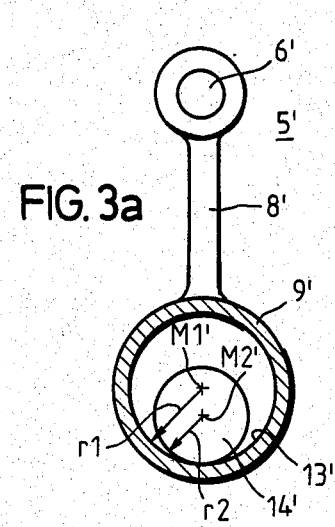
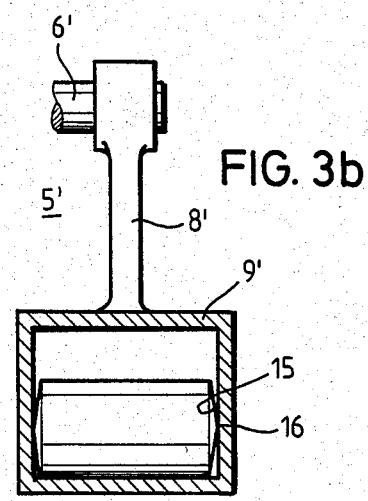
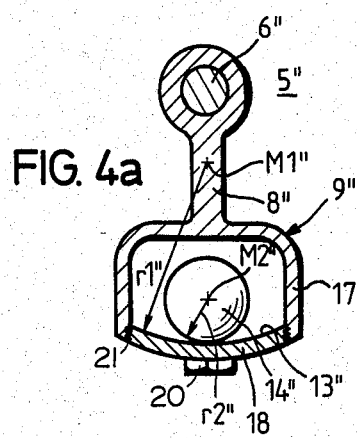
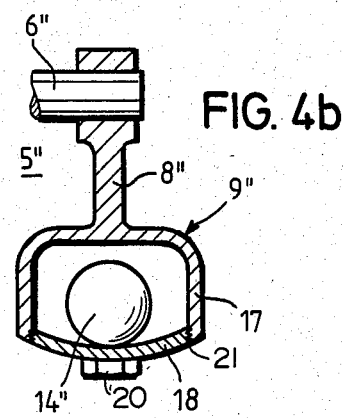
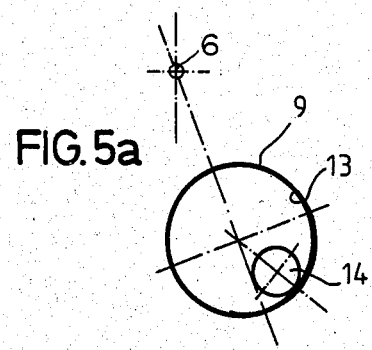
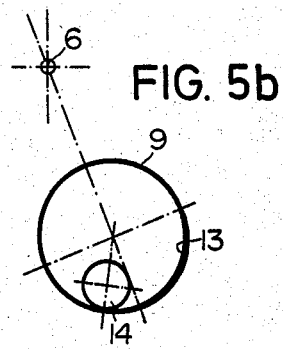

PENDULUM FOR DAMPING OR ELIMINATING LOW EXCITATION FREQUENCIES

BACKGROUND OF THE INVENTION

The invention relates to an apparatus, such as a pendulum, for damping or even eliminating low excitation frequencies of a structural component such as a helicopter rotor blade or the like.

In connection with helicopters vibrations in the helicopter body or nacelle are primarily caused by periodically occurring forces and moments which are transmitted by the helicopter rotor blades into the helicopter body or nacelle. Due to the transmission of these forces and moments, also referred to as loads, from the rotating system, including the helicopter rotor, into the fixed or stationary system, including the helicopter body, only certain so-called rotor harmonic forces and moments may be transmitted and these forces and moments are dependent on the number of the rotor blades. In the instance of a hingeless helicopter rotor having four rotor blades and due to the just stated fact, the so-called $3\Omega$ and $5\Omega$ moments at the rotor blade foot or neck are controlling for the low frequency nacelle vibrations. In this connection $\Omega$ designates the so-called rated rotary frequency which, for example, in the mentioned helicopter type is about 7 Hertz corresponding to 44.4 radians per second (rad/s). The vibration suppressor, in the example here described a governor or centrifugal pendulum, must be constructed with due regard to the frequency to be suppressed in this instance, for example $3\Omega$ equal to 21 Hz. Such construction is necessary so that the vibration suppressor is capable of absorbing the periodic forces or moments which are otherwise capable of being transmitted from the helicopter rotor blades to the helicopter nacelle.

It would also be advantageous to further reduce the vibrations in the helicopter nacelle which are caused by the next higher harmonic forces in the present instance, for example, the $5\Omega$ forces and moments. For this purpose a further vibration suppressor would have to be installed, for example, in a $5\Omega$ governor or centrifugal pendulum. However, such installation is not possible or only possible with great difficulties due to the limited space available for such purpose.

OBJECTS OF THE INVENTION

In view of the above it is the aim of the invention to achieve the following objects singly or in combination:

to improve a centrifugal pendulum in such a manner that the improved pendulum is capable of suppressing several excitation frequencies;

to construct a centrifugal pendulum or multiple pendulum in such a manner that its dimensions and other characteristics are adaptable in a wide range to the requirements or conditions of any particular installation situation; and to construct a multiple, integrated pendulum in such a manner that its simple construction is substantially free of any maintenance requirements.

SUMMARY OF THE INVENTION

According to the invention the multiple pendulum comprises several pendulum bodies coupled to each other and tuned relative to each other in such a manner that the multiple pendulum has several eigenfrequencies. These eigenfrequencies are adjusted or tuned to the excitation frequencies of the structural component to which the multiple pendulum is connected or secured, for example, a helicopter rotor blade. One possibility of constructing such a multiple pendulum, e.g., in the form of a double pendulum, involves connecting two separate pendulums through a bearing journal to each other. In such a structure both pendulums swing or oscillate in phase at the first eigenfrequency and they oscillate in counterphase at the second eigenfrequency. However, such a structure with a coupling bearing journal can be further improved to even avoid any bearing lubrication. Thus, according to the invention, the double pendulum is preferably realized by a hollow pendulum body forming a housing for a rolling body installed inside the housing for rolling on a bearing surface in the oscillation direction of the double pendulum. The rolling body is then also capable of oscillating about its rest position.

In such a structure as disclosed by the invention the pendulum housing forms one pendulum and the rolling body inside the hollow pendulum housing forms a second pendulum mass so that this surprisingly simple construction results in an integrated double pendulum for suppressing two excitation frequencies very efficiently. These double pendulums, may, for example, be easily arranged in pairs for a further improved efficiency. The hollow pendulum housing and the rolling body in such housing oscillate in phase at the first eigenfrequency while they oscillate in phase opposition at the second eigenfrequency.

In the application of the present multiple pendulums to a helicopter blade the pendulums are to be tuned so that the two eigenfrequencies correspond to the respective excitation frequencies of the helicopter blade. Thus, the first eigenfrequency should be at $3\Omega$ and the second eigenfrequency should be at $5\Omega$.

The rolling bodies used according to the invention may comprise a sphere or a cylinder. In both instances a roller pendulum is achieved, since the bearing surface on which the rolling body is movable is curved.

BRIEF FIGURE DESCRIPTION

In order that the invention may be clearly understood, it will now be described, by way of example, with reference to the accompanying drawings, wherein:

FIGS. 3a and 3b show a second embodiment of a double pendulum according to the invention, wherein FIG. 3a shows a sectional view perpendicularly to the journal or pivot axis, while FIG. 3b shows a sectional view with the section plane extending in the direction of the pivotal journal axis;

FIGS. 4a and 4b show views similar to those of FIGS. 3a and 3b, however, of a modified embodiment of a double pendulum according to the invention; and FIGS. 5a and 5b illustrate a schematic representation for explaining the types of oscillations that occur at the two eigenfrequencies of a double pendulum according to the invention.

DETAILED DESCRIPTION OF PREFERRED EXAMPLE EMBODIMENTS AND OF THE BEST MODE OF THE INVENTION

Figure 1:
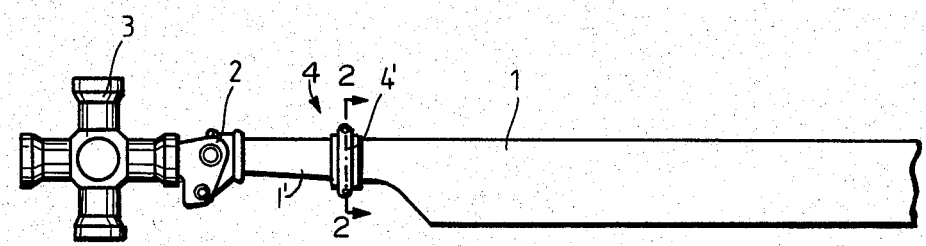
FIG. 1 is a partial illustration of a helicopter rotor in a top plan view showing only a portion of one rotor blade on which a double pendulum according to the invention is mounted.

The top plan view of FIG. 1 shows a helicopter rotor in which only a portion of one helicopter rotor blade 1 is shown. All the other blades are connected to the rotor head 3 by bearings 2 in the same manner as the blade 1. The blade 1 has a blade neck 1'. A pendulum device 4 according to the invention is mounted to the blade neck 1'. The pendulum device 4 comprises two integrated double pendulums according to the invention.

Figure 2:
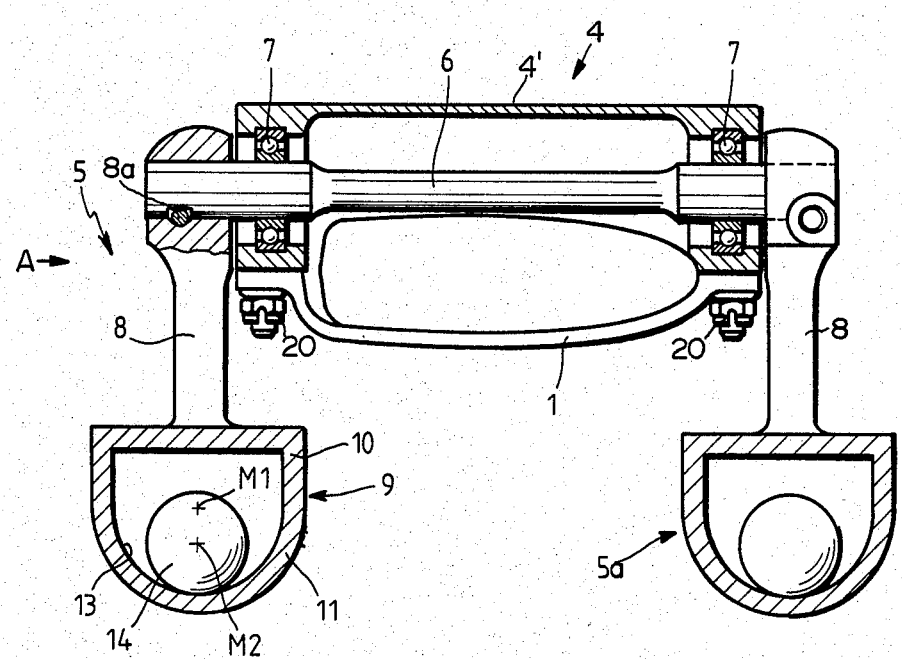
FIG. 2 is a sectional view along section line 2—2 in FIG. 1.

FIG. 2 illustrates the structural features of the pair of double pendulums according to the invention. Two pendulums 5 and 5a rigidly secured through rods 8 to a common pendulum shaft 6. A wedging pin 8a prevents any rotation of the rods 8 relative to the shaft 6. The shaft 6 is rotatably mounted in roller bearings 7 in turn held in a mounting bracket 4' secured to the blade neck 1' of the rotor blade 1 by screws 20. Both pendulums 5 and 5a oscillate together with the shaft 6 due to the rigid connection of the arms 8 to the shaft 6.

Each pendulum 5, 5a comprises a pendulum body 9 having a cylindrical upper section 10 secured to the respective rod 8 and a hollow semisphere 11 forming preferably an integral bottom of the cylindrical section 10. Inside the semispherical bottom 11 there is provided a bearing surface 13 on which a rolling means such as a sphere 14 is movable. M1 indicates the center of the semisphere forming the bearing surface 13. M2 designates the center of the spherical roller body 14. Both pendulums 5, 5a form a double pendulum so that the structure shown in FIG. 2 constitutes a multiple pendulum having a total of four pendulums.

The double pendulum shown in FIG. 5 has two eigenfrequencies at which the double pendulum operates as will now be described with reference to FIG. 5. At the first eigenfrequency the hollow pendulum body 9 and the sphere 14 oscillate or swing in phase as shown in FIG. 5a, wherein both the body 9 and the sphere 14 move in the same direction. At the second eigenfrequency the two pendulums 9 and 14 move in phase opposition as shown in FIG. 5b. The dimensions of the integrated double pendulums and the masses of the individual pendulums are adjusted or tuned to each other so that the two eigenfrequencies correspond to the respective excitation frequencies of the rotor blade, for example, $3\Omega$ and $5\Omega$. In case that the double pendulum is to operate under centrifugal force conditions forming a centrifugal force field in which the pendulum is installed, the respective eigenfrequencies adapt themselves automatically to any r.p.m. change since the pendulums are dependent on the rated r.p.m.

FIGS. 3a and 3b illustrate a further embodiment of an integrated double pendulum according to the invention. The same components are provided with the same reference numbers except that the prime symbol has been added to these reference numbers. The integrated double pendulum 5' comprises a pendulum shaft 8' having secured to its free end a pendulum body 9' in the form of a hollow cylinder. The cylinder central axis is shown at M1' extending in parallel to the mounting or pendulum shaft 6' to which a double pendulum is secured at each end as described. The hollow cylinder is provided on its inner surface with a bearing surface 13' on which a solid cylinder 14' may roll back and forth. The cylinder axis M2' is located below the center M1' of the roller surface 13'. The rolling or bearing surface 13' has a radius r1. The solid cylinder 14' has a radius r2. The end surfaces of the solid cylinder 14' are formed as cones 15, whereby the tips 16 of the cone rest against the inwardly facing end walls of the hollow cylinder 9'. This feature guides the hollow cylinder 14' when it rolls along the bearing surface 13'. In this embodiment of FIGS. 3a, 3b the two eigenfrequencies also correspond to the respective excitation frequencies and the operation is the same as explained above with reference to FIGS. 5a and 5b.

FIGS. 4a and 4b illustrate a further example embodiment of a double pendulum according to the invention, wherein again the same components are designated by the same reference numbers with the addition of the double prime symbol.

Again a double pendulum body 9" is secured to the lower end of a pendulum rod 8" rigidly secured at its upper end to the pendulum shaft 6". The body 9" is somewhat bell-shaped and downwardly open to form a housing 17, the bottom of which is formed by a curved separate member 18 screwed into the housing 17 which is provided with a respective threading 21. The curved bottom member 18 constitutes a segment of a spherical shell or dish, whereby the center M1" constitutes the center of such spherical dish having a radius r1". The center M1" is located on the axis of the pendulum rod 8" between the bell-shaped housing 17 and the shaft 6". A solid ball or sphere 14" having the center M2" and the radius r2" rolls on a bearing surface 13" of the curved bottom member 18.

The structure illustrated in FIG. 4 has the advantage that the dimensions of the integrated double pendulum are changeable in a wide range simply by using different bottom members 18 having different radii of curvature for the respective bearing surface 13". The function is the same as has been described above with reference to FIGS. 5a and 5b with regard to the two eigenfrequencies.

An integrated double pendulum or multiple pendulum according to the invention has a very simple structure and is substantially completely free of any maintenance requirements. Further, such pendulums according to the invention may be constructed to have more than two eigenfrequencies in accordance with the same teaching by changing the dimensions of the two pendulums in the form of the housing and the rolling means such as a ball or cylinder inside the housing. Thus, further excitation frequencies of a rotor blade may be damped or suppressed. Such damping or suppression of further excitation frequencies will be applied if the amplitudes of such further frequencies are large enough to warrant such damping or suppression. If these amplitudes are small enough so that they can be taken up by the rotor blade, the use of further pendulums may not be necessary.

Although the invention has been described with reference to specific example embodiments, it will be appreciated, that it is intended to cover all modifications and equivalents within the scope of the appended claims.

What is claimed is:

1. A pendulum apparatus for damping or eliminating low excitation frequencies of a helicopter rotor blade. comprising at least one multiple pendulum device (5) including at least two individual pendulum bodies (8, 14), first means (11) operatively coupling said at least two individual pendulum bodies (8, 14) to each other to form said multiple pendulum device, said individual pendulum bodies (8, 14) being tuned to each other so that the respective multiple pendulum device has several eigenfrequencies, and second means for operatively connecting said multiple pendulum device (5) to said helicopter rotor blade for damping or eliminating said low excitation frequencies.

2. The apparatus of claim 1, wherein said at least two individual pendulum bodies of said multiple pendulum device comprise a hollow pendulum body forming a housing having a bearing surface forming said first coupling means, and a roller body means arranged in said housing for rolling back and forth in an oscillation direction on said bearing surface forming said first coupling means, said roller body means being able to additionally oscillate in a rolling manner about its rest position.

3. The apparatus of claim 2, wherein said bearing surface is curved.

4. The apparatus of claim 3, wherein said roller body means comprise a sphere and wherein said curved bearing surface is a shell part of a hollow sphere.

5. The apparatus of claim 3, wherein said roller body means comprise a cylinder, and wherein said curved bearing surface is a shell part of a hollow cylinder.

6. The apparatus of claim 1, comprising two multiple pendulum device (5) and wherein said second connecting means comprise a shaft, bearing means operatively mounting said shaft to said helicopter rotor blade, said two multiple pendulum devices being rigidly secured to said shaft.

7. The apparatus of claim 6, wherein said helicopter rotor blade has a longitudinal axis, said connecting shaft extending crosswise relative to said longitudinal axis, whereby said two multiple pendulum devices are rotatable with said coupling shaft relative to said longitudinal axis.

8. The apparatus of claim 5, wherein said cylinder roller has conical ends resting against the inner side surface of said bearing housing.

* * * * *